United States Patent [19]
Heiman et al.

[11] Patent Number: 5,384,212
[45] Date of Patent: Jan. 24, 1995

[54] FLEX-RIB PLAQUES FOR BATTERIES

[75] Inventors: Jerome R. Heiman, Campbellsport; Jack Bruss, Elm Grove, both of Wis.

[73] Assignee: Globe-Union Inc., Milwaukee, Wis.

[21] Appl. No.: 232,376

[22] Filed: Apr. 25, 1994

[51] Int. Cl.⁶ .................. H01M 2/10; H01M 2/14
[52] U.S. Cl. .................... 429/143; 429/66; 429/186; 429/247
[58] Field of Search ............ 429/66, 129, 143, 186, 429/247

[56] References Cited

U.S. PATENT DOCUMENTS

| | | | |
|---|---|---|---|
| 1,888,890 | 11/1932 | Sandman | 429/186 |
| 1,957,342 | 5/1934 | Huntsberger | 429/186 |
| 2,820,080 | 1/1958 | Kaljot | 429/186 |
| 3,340,100 | 9/1967 | Silvestri | 429/143 |
| 3,607,440 | 9/1971 | Olmsted | 429/186 X |
| 4,729,933 | 3/1988 | Oswald | 429/66 X |
| 5,187,031 | 2/1993 | Heiman et al. | 429/129 |
| 5,234,779 | 8/1993 | Mix et al. | 429/186 |

*Primary Examiner*—Anthony Skapars
*Attorney, Agent, or Firm*—Foley & Lardner

[57] ABSTRACT

A flexible rib plaque is provided for insertion between battery cell elements and the end and/or an interior wall of the battery container. The plaque improves performance by limiting the harmful effects caused by flexing of the container walls due to hydraulic pressure changes of the electrolyte contained within the battery. The ribs of the plaques may be located on one or both sides of the plaque. If ribs extend from only one side, they may contact the cell element or the container wall.

22 Claims, 2 Drawing Sheets

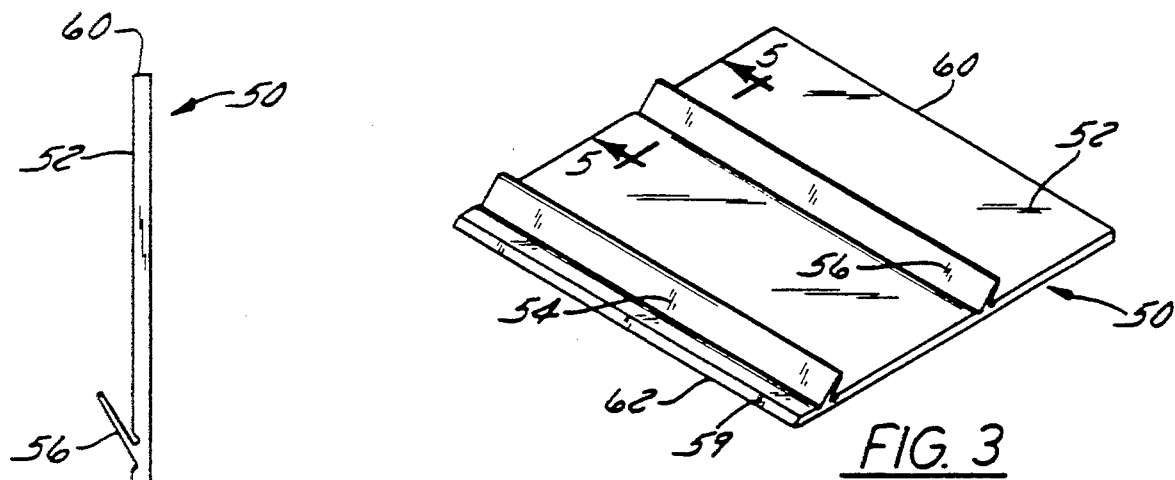
FIG. 3
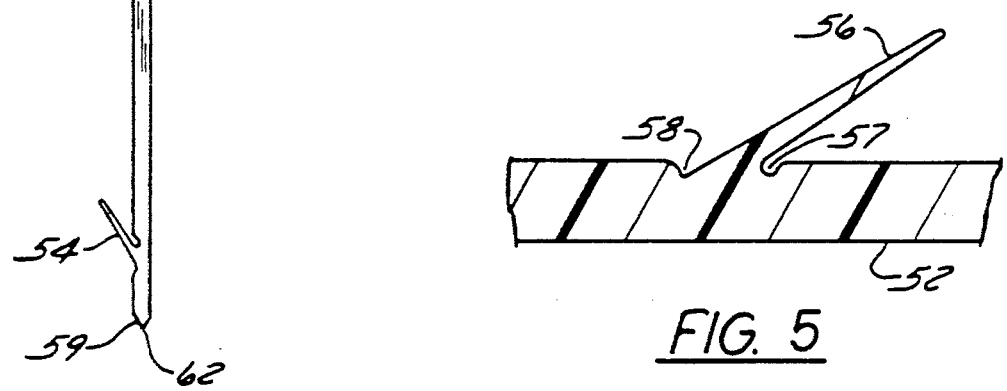
FIG. 4
FIG. 5
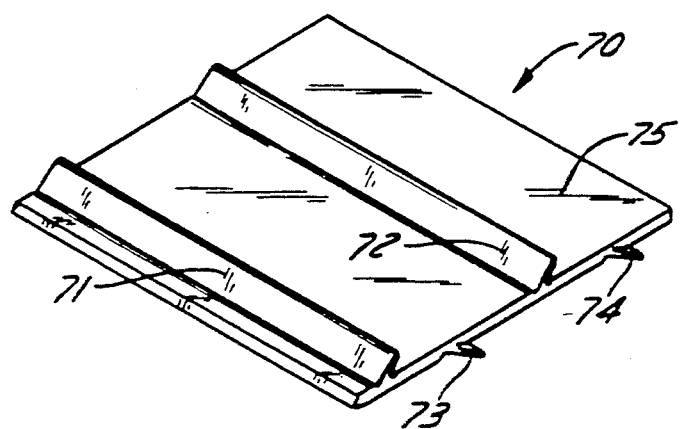
FIG. 6

FLEX-RIB PLAQUES FOR BATTERIES

BACKGROUND OF THE INVENTION

Field of the Invention

The present invention relates generally to the art of batteries, such as SLI batteries used for vehicles, boats and the like. More particularly, the invention relates to the field of improving battery performance by diminishing the effects of vibration on battery performance. Still more particularly the invention relates to plaques which may be inserted between cell elements and walls of the battery container.

DESCRIPTION OF THE PRIOR ART

The fact that battery vibration reduces the useful life of vehicle and marine batteries is very well known. The problem of vibration is especially prominent in situations where vehicles are used for off-road travel and hauling.

Several techniques have been developed for protecting batteries from the effects of vibration, including anchoring the cell elements to the bottom of the battery container using an epoxy or other hot melt adhesive. This solution is not entirely helpful, especially when using thin-walled polypropylene batteries, due to the flexing in and out of the battery container walls caused by changes in hydraulic pressure within the cells. The oscillating hydraulic pressure is induced by the positive and negative "G" forces of the dynamic motion environment in which the battery operates, a phenomenon commonly referred to as "oil canning." The effect is most prominent near the end walls where the plates next to the end walls also flex, leading to stresses on the battery lugs, which in turn can eventually become detached from the battery collector straps, resulting in element imbalance and rapid deterioration of the overall performance of the battery. Additionally, the anchoring of battery elements using adhesives can add substantial costs to the production of batteries, as well as environmental problems inherent in the use of chemicals in modern industry.

The assignee of the present invention has suggested two solutions to this problem, one involving the use of "reinforcement sheets" inserted between the end cell elements and the container walls. These sheets produced a 7-8% compression of all battery elements within the container and resulted in increased electrical cycle life. The reinforcement sheets also improved handling characteristics (e.g. carrying, packing, stacking, etc.) of the battery.

The reinforcement sheets were made from polyphenylene sulfide and had a flexural modulus of greater than 1,000,000 psi. The flexural modulus is a measure of the stiffness of a material derived from ASTM test #D790-86. Greater stiffness will result in a higher flexural modulus. This battery was never tested for compliance with modern SAE "Off-Road" Vibration Specifications (J930). Nevertheless, it is believed that the reinforcement sheets would have been successful in reducing the effects of vibration to some degree.

The reinforcement sheets were prepared in the same shape as the battery elements themselves, covering only the area of the battery container walls below the straps. The area adjacent the straps was not reinforced. Installation of these sheets required off-production line manufacturing, because the last element inserted into the battery had to be tapped in with a mallet to achieve the necessary compression. This battery, therefore, was not extensively produced or marketed.

Another improvement is the one discussed in U.S. Pat. No. 5,187,031, issued Feb. 16, 1993 to Heiman, et al. for "Anti-Vibration Plaque for a Battery." In this device, a flat, rigid, anti-vibration plaque having a shape of the end wall of a battery, with at least one rectangular cut-out along the top edge, was disclosed. The plaque had a thickness in its most preferred embodiment of approximately 0.125 inches, and the cut-outs were designed to ensure that an interference fit would be achieved, including both the grid and the strap areas of the batteries. In the case of one plate, rectangular cut-outs are provided adjacent the upper corners of the rigid plaque, while for the opposite end wall, a rectangular cut-out was made at the middle of the top of the plaque. These plaques were also designed to enable the battery to pass the SAE "Off-Road" Vibration Specifications (J930) without the need for epoxy or other type of adhesive. The plaque was also designed to be inserted during manufacturing without compromising production efficiency.

While the two solutions suggested above resulted in batteries which were more durable from a vibration standpoint and which overcame, at least partially, the "oil canning" effects, the solutions were not completely satisfactory. Accordingly, there remains a need for structure within the battery to further eliminate the problems caused by hydraulic flexing of the container.

SUMMARY OF THE INVENTION

The present invention features a new plaque design for batteries which includes flexible ribs on one or both sides. The invention also features a plaque design which may be used within the battery, as well as adjacent the end container walls. The invention still further features a plaque which may be extrusion molded for ease in manufacture and which accomplishes the desirable objectives without requiring further manufacturing steps, such as cutting out rectangular sections.

The invention further features a flexible rib plaque which reduces the effects of vibration on battery performance, enabling it to meet tough standards for off-road and recreational vehicles and boats.

How these and other features of the invention are accomplished will be described below in the Detailed Description of the Preferred Embodiment, taken in conjunction with the drawings. Generally, however, the features are provided by employing a flex-rib plaque having, in the most preferred and illustrated embodiment, two ribs integrally molded to the plaque base in an extrusion process, one of the ribs being generally centrally located and horizontally disposed and the other rib being adjacent the lower edge of the plaque and parallel to the other rib. In its most preferred embodiment, the flex-rib plaque is made from polypropylene. The batteries are prepared employing the plaque yielding a substantially improved hours to failure when compared with glass sheet or planar plaque designs. Also, using the preferred plaque, the ribs may be disposed so that the ribs contact the container walls (end or intermediate) while the planar surface adjoins the battery cell elements. The arrangement may be reversed for other design objectives or, in the case of an alternate plaque design having ribs on both sides, both a container wall and the battery element may be contacted by the ribs. Other ways in which the features of the invention are accomplished will become apparent to those skilled in the art after reading the present specification, such other ways being deemed to fall within the scope of the present invention.

BRIEF DESCRIPTION OF THE DRAWINGS

FIG. 3 is a perspective view of a flexible rib plaque according to the most preferred form of the present invention;

FIG. 4 is a side view of the flexible rib plaque shown in FIG. 3;

FIG. 5 is an enlarged sectional view taken along the line 5—5 of FIG. 3 and showing in detail the rib construction; and FIG. 6 is a perspective view of an alternate form of the invention and showing flexible ribs on both sides of a plaque.

In the various FIGURES, like reference numerals are used to denote like components.

DETAILED DESCRIPTION OF THE PREFERRED AND ALTERNATE EMBODIMENTS

Before proceeding to the description of the FIGURES, several comments should be made about the applicability and scope of the present invention. First, it should be noted that the size of the particular plaque will vary widely, depending upon the battery with which it will be used. Moreover, the number of ribs on either or both sides of the plaque can vary. While the illustrations show two such ribs on a side, more could be used, especially for larger batteries, and the particular location of the ribs (the illustrations showing one near an edge and one near the center) could also vary without departing from the scope of the present invention.

Second, while one of the advantages of the present invention is that the plaque be made by extrusion molding, other techniques can be used for forming the ribs and the plaques. With regard to materials, our preferred material is an extrudable polypropylene homopolymer having a tensile strength of 4800 psi and a flexural modulus of 195,000 psi, but virtually any polypropylene and other related types of polymers could be used, as long as they can tolerate the harsh environment of lead-acid batteries. Another useful material for an injection molded system is K-W 1000 AD resin available from K. W. Plastics. This material is a reclaimed polypropylene copolymer having a tensile yield strength of 3300 psi (min) and a flexural modulus of 150,000 psi (min). These materials are suitable for extrusion molding and have sufficient stiffness to provide the advantages which are described above. Furthermore, while the drawings show the flexible ribs extending from one edge of the plaque to the other, the orientation of the ribs with respect to the positioning of the battery could be changed, e.g. where the ribs go vertically in the battery rather than horizontally. The ribs could also be discontinuous along their length or extending for less than the full width of the plaque. Accordingly, a number of variations can be made without departing from the intended scope.

Figure 1:
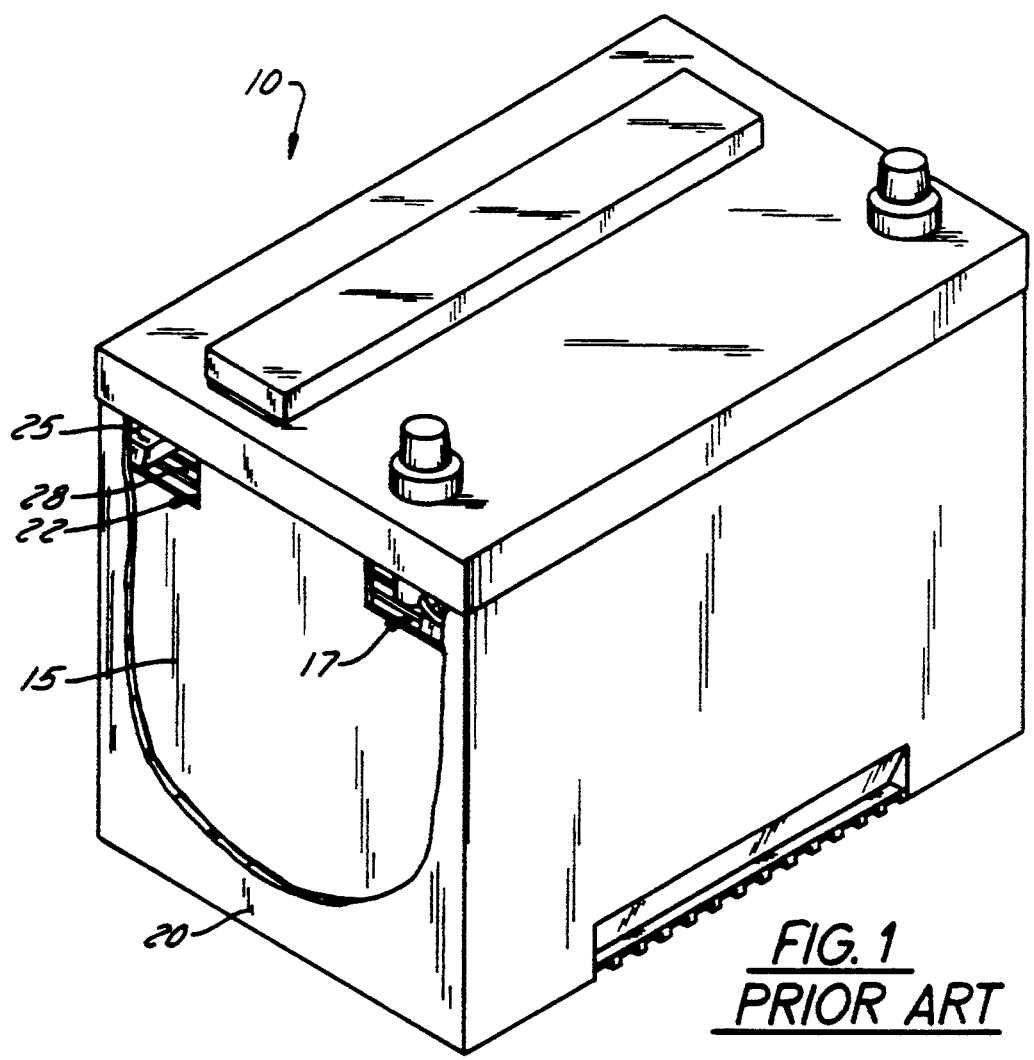
FIG. 1 is a perspective view of a prior art vehicle battery having flat plaques on the outer ends thereof according to the aforementioned '031 patent.

One other comment should be made, especially in connection with the prior art battery shown in FIG. 1. That is, the flex-rib plaques could include the rectangular cut-outs of the prior art battery plaques without departing from this invention's scope. To do so, however, adds additional manufacturing steps, leading to additional cost in battery manufacture, as well as the need for additional care during manufacture to ensure that the appropriate plaque shape is used at the appropriate place in the battery. We have found that the cut-outs are not necessary to provide substantial improvements in battery performance under vibration conditions.

Referring now to FIG. 1, a vehicle battery 10 comprises two anti-vibration plaques 15, one of which is shown in the cut-away view, in accordance with the teachings of the aforementioned, commonly-owned '031 patent. Each plaque 15 is disposed exterior to an end cell element 17 and interior of a corresponding container end wall 20. Each anti-vibration plaque 15 is in the shape of the container end wall 20 except for cut-out portions 22 located along the top edge to facilitate ease of manufacturing by preventing contact between the plaque 15 and the straps 25 which connect the plates 28 in the end cell compartment.

The battery 10 is a typical thin-walled polypropylene type. Dimensions of the battery 10 which are important to the invention of the '031 patent are those relating to the size and shape of the end wall 20, the location of the straps 25 employed for connection of end cell elements 17 and the thickness of the space between each container end wall 20 and its corresponding end cell element 17 prior to the insertion of the plaque 15.

Figure 2:
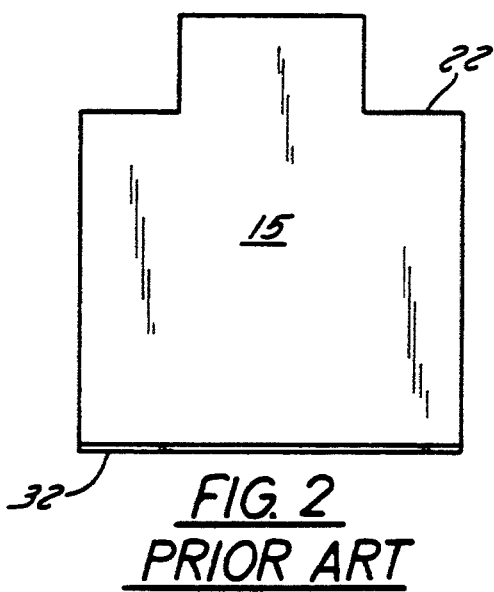
FIG. 2 is a front view of one of the anti-vibration plaques for the battery of the prior art shown in FIG. 1.

Referring now to FIG. 2, the anti-vibration plaque 15 shown in FIG. 1 is illustrated in front view and is shaped for application to vehicle batteries, with straps 25 located on the outer portion of the elements. For the plaque 15 at the opposite end of the battery, there would be a cut-out located at the center, rather than at the corner, to account for the straps which would be present at that particular area.

The plaques 15 provide reinforcement and protect against end wall flexing by maintaining contact with all but a very small portion of the surface area of the container end wall 20 and the end cell element 17 between which it is inserted.

The prior art patent indicates that adjustments can be made to ensure a snug fit and that the end cell element 17 is compressed against the end wall 20. The interference fit in that patent was accomplished by manufacturing each plaque 15 to have a thickness of approximately 0.125 inches ±0.005 inches or to be at least 0.025 inches, but not more than 0.075 inches, greater in thickness than the space between the end cell element 17 and container end wall 20 into which it is inserted. While not shown well in either FIGS. 1 or 2, the bottom 32 of each plaque 15 is tapered, preferably at a 30° angle from the vertical plane, the taper extending from each side, creating a wedge shape to facilitate insertion of the device between the end cell element 17 and the container end wall 20 of the battery during routine, on-line manufacture. Also, as mentioned before, the plaques of the aforementioned '031 patent were very stiff, having a flexural modulus of at least 250,000 psi, preferably being approximately 400,000 psi. Such modulus was achieved in the prior art by the use of 20% glass-filled polypropylene in the preferred embodiment.

Proceeding now to FIG. 3, a flex-rib plaque 50 according to the most preferred embodiment of the present invention includes a generally planar base 52 and a pair of ribs 54 and 56 extending therefrom. In the illustrated and preferred embodiment, plaque 50 is made by extrusion molding so that ribs 54 and 56 are integral with base 52. The details of one of the ribs 56 is shown in FIG. 5, indicating that the rib angle is approximately 50°±10° on average, and that indentations 57 and 58 are located on either side of the junction of rib 56 and base 52. Indentations 57–58 result primarily from the molding process and need not be present to accomplish the goals of the invention. In the most preferred embodiment, the base has a thickness of approximately 0.125 inches ±0.010 and the overall width of the rib is approximately 0.300 inches ±0.025. As previously mentioned, both the location and number of the ribs can be varied from that shown in FIG. 3. In FIG. 3, rib 54 is located inwardly of bottom edge 59 of plaque 50, while rib 56 is shown generally adjacent the center but nearer the top edge 60. If three ribs were used, for example, they could be equally spaced or spaced at varying distances.

The plaque 50 is also shown in side view in FIG. 4 to show that, similarly to the prior art, edge 59 is tapered to a point 62 to facilitate insertion of the plaque into the cell compartment.

FIG. 6 illustrates yet another embodiment where a plaque 70 includes four ribs 71–74, two on either side of base 75. Again, the number and location of the ribs could be varied, as described above.

It should also be pointed out that while the ribs are shown in a position where they would lie horizontally when the illustrated plaques are inserted into a battery with edge 59 adjacent the bottom of the battery container, the ribs could also De arranged vertically for performing their function of absorbing vibration and assisting in prevention of damage to the battery through oil canning and the like. Moreover, if a plaque is employed which has ribs on only one side, they can be oriented either towards the container wall or toward the plate of the adjoining cell element. In fact, the results achievable in the present invention are generally the same no matter which way the ribs are oriented. From the standpoint of acid circulation within the cell, it may be preferable to place the ribs so that they contact the plate. However, if oriented outwardly, insertion might be facilitated, increasing the efficiency of the production line, even though effectiveness of the ribs may be diminished somewhat in that they may be having point contact as opposed to full contact with battery container ribs which are typical for the end walls. This choice can be eliminated by using plaques with ribs on both sides.

While the prior art discussed above has focused on the enhancements available by placing plaques between cell elements and the end walls of a battery container, the plaques of the present invention are also suitable for use between cell elements and the interior walls of a battery. In fact, it is within the scope of the present invention to use such plaques in all cells of a standard 12 volt, 6 cell automotive battery, preferably one plaque for each cell. Again, there may be situations where the plaques could be used in tandem in each cell, although obviously, with each increased element added to a battery, there is an increase in cost of materials and in production costs as well.

While the present invention has been illustrated in connection with certain preferred embodiments in which the ribs extend all the way across the plaques, obviously, the scope of the invention is intended to cover situations where the ribs are discontinuous along their length, which could provide raw material savings without sacrificing performance. Other modifications, such as the one just mentioned, will appear to those skilled in the battery art after the principles of the invention and the benefits which may be obtained by using it are understood. The invention therefore is deemed to be as broad in scope as the claims which follow.

What is claimed is:

1. A battery including a container and at least one cell element located within the container, a flex-rib antivibration plaque located within the container and intermediate a surface thereof and a cell element, the plaque including a generally planar base and at least one elongate, flexible rib extending at an acute angle therefrom.

2. The battery of claim 1, wherein the container includes end walls and a plaque is located intermediate a cell element and an end wall.

3. The battery of claim 2, wherein the container includes at least one intermediate wall dividing the container into at least two compartments, a cell element being located in each compartment and a flex-rib plaque being located intermediate a cell element and an intermediate wall.

4. The battery of claim 1, wherein the flex-rib plaque is oriented so that the rib edge remote from the base contacts the cell element.

5. The battery of claim 1, wherein the flex-rib plaque is oriented so that the rib edge remote from the base contacts the container surface.

6. The battery of claim 1, wherein the container includes a bottom and wherein each plaque is arranged so that each rib is horizontally disposed relative to the container bottom.

7. The battery of claim 1, wherein at least one rib extends from either side of the base.

8. The battery of claim 1, wherein each rib and the base are integral.

9. The battery of claim 8, wherein the base and rib are made from extruded polypropylene.

10. The battery of claim 1, wherein each plaque includes at least two parallel and spaced apart ribs.

11. The battery of claim 1, wherein each plaque is generally rectangular and wherein one edge thereof is tapered to an elongate linear edge, each rib being spaced apart and parallel to the tapered edge.

12. A battery comprising a container having a bottom, first and second end walls and a plurality of intermediate walls parallel to the end walls and dividing the container into a plurality of compartments, battery cell elements located in the compartments and at least one flex-rib plaque located in an interference fit relationship between a battery wall and a cell element, the plaque comprising a generally planar base having at least one elongate, flexible rib extending at an acute angle therefrom.

13. The battery of claim 12, wherein a flex-rib plaque is located between an end wall and the adjoining cell element.

14. The battery of claim 12, wherein a flex-rib plaque is located between each end wall and an adjoining cell element.

15. The battery of claim 12, wherein a flex-rib is also located between at least one of the intermediate walls and an adjoining cell element.

16. The battery of claim 12, wherein the flex-rib plaque is oriented so that the rib edge remote from the base contacts the cell element.

17. The battery of claim 12, wherein the flex-rib plaque is oriented so that the rib edge remote from the base contacts the container surface.

18. The battery of claim 12, wherein at least one rib extends from either side of the base.

19. The battery of claim 12, wherein each rib and the base are integral.

20. The battery of claim 19, wherein the base and rib are made from extruded polypropylene.

21. The battery of claim 12, wherein each plaque includes at least two parallel and spaced apart ribs.

22. The battery of claim 12, wherein each plaque is generally rectangular and wherein one edge thereof is tapered to an elongate linear edge, each rib being spaced apart and parallel to the tapered edge.

* * * * *